(12) United States Patent
Krishnaswamy et al.

(10) Patent No.: US 9,264,353 B2
(45) Date of Patent: Feb. 16, 2016

(54) DYNAMIC SUBFLOW CONTROL FOR A MULTIPATH TRANSPORT CONNECTION IN A WIRELESS COMMUNICATION NETWORK

(75) Inventors: Dilip Krishnaswamy, San Diego, CA (US); Dirceu G. Cavendish, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/241,149

(22) Filed: Sep. 22, 2011

(65) Prior Publication Data

US 2013/0077501 A1    Mar. 28, 2013

(51) Int. Cl.
| | |
|---|---|
| *H04L 12/801* | (2013.01) |
| *H04L 12/725* | (2013.01) |
| *H04L 12/707* | (2013.01) |
| *H04L 12/721* | (2013.01) |

(52) U.S. Cl.
CPC ............... *H04L 45/70* (2013.01); *H04L 45/24* (2013.01); *H04L 45/306* (2013.01); *H04L 47/14* (2013.01); *H04L 47/193* (2013.01)

(58) Field of Classification Search
CPC ..... H04L 45/70; H04L 47/193; H04L 45/306; H04L 45/24
See application file for complete search history.

(56) References Cited

U.S. PATENT DOCUMENTS

| | | | |
|---|---|---|---|
| 6,178,448 B1 | 1/2001 | Gray et al. | |
| 7,339,897 B2 * | 3/2008 | Larsson | H04L 45/10 370/216 |
| 7,349,380 B2 * | 3/2008 | Barker, Jr. | H04L 29/12009 370/349 |
| 7,359,971 B2 * | 4/2008 | Jorgensen | H04L 1/20 370/328 |
| 7,376,087 B2 * | 5/2008 | Srikrishna | H04L 12/2602 370/238 |
| 7,561,517 B2 | 7/2009 | Klinker et al. | |
| 7,643,427 B2 * | 1/2010 | Kokku | H04L 45/00 370/237 |
| 7,796,503 B2 | 9/2010 | Hamada et al. | |

(Continued)

FOREIGN PATENT DOCUMENTS

| | | |
|---|---|---|
| EP | 1786151 A2 | 5/2007 |
| EP | 2040390 A1 | 3/2009 |

(Continued)

OTHER PUBLICATIONS

"The End-to-End Effects of Internet Path Selection" Stefan Savage, Andy Collins, Eric Hoffman John Snell, and Thomas Anderson, Department of Computer Science and Engineering University of Washington, Seattle,SIGCOMM '1999 8199 Cambridge, MA, USA ACM SIGCOMM Computer Communication Review Homepage, vol. 29 Issue 4, Oct. 1999, pp. 289-299.*

(Continued)

*Primary Examiner* — Andrew Lai
*Assistant Examiner* — Hoyet H Andrews
(74) *Attorney, Agent, or Firm* — Charles E. Eggers

(57) ABSTRACT

A multipath transport protocol such as multipath TCP can utilize metrics such as a wireless link condition corresponding to one or more paths as a parameter for controlling a dynamic allocation of data and control signaling over respective paths. Fault-tolerant control can enable retransmissions of packets already sent on a poor path, onto a good path. Further, the feedback, the retransmissions, and other control signaling can be provided on a separate subflow or on a UDP overlay. In this way, a multipath TCP connection can be more reliable and efficient as flow control and data flow are enhanced.

29 Claims, 9 Drawing Sheets

(56) References Cited

U.S. PATENT DOCUMENTS

| | | | |
|---|---|---|---|
| 8,320,250 B2* | 11/2012 | Speight | H04W 80/06 370/235 |
| 2002/0080755 A1 | 6/2002 | Tasman et al. | |
| 2002/0083172 A1 | 6/2002 | Knowles et al. | |
| 2004/0013089 A1* | 1/2004 | Taneja et al. | 370/235 |
| 2006/0098611 A1* | 5/2006 | Joshi | H04L 45/02 370/338 |
| 2006/0105764 A1* | 5/2006 | Krishnaswamy | H04L 45/22 455/424 |
| 2006/0126507 A1* | 6/2006 | Nakayasu | 370/229 |
| 2006/0193295 A1* | 8/2006 | White | H04L 12/5692 370/336 |
| 2007/0005787 A1 | 1/2007 | Igarashi et al. | |
| 2007/0087829 A1 | 4/2007 | Liu et al. | |
| 2007/0094325 A1 | 4/2007 | Ih et al. | |
| 2007/0109990 A1 | 5/2007 | Bennett | |
| 2007/0211720 A1 | 9/2007 | Fuchs et al. | |
| 2007/0291765 A1 | 12/2007 | Boley et al. | |
| 2008/0102877 A1* | 5/2008 | Suemitsu et al. | 455/522 |
| 2008/0108437 A1 | 5/2008 | Kaarela et al. | |
| 2008/0133767 A1 | 6/2008 | Birrer et al. | |
| 2008/0247355 A1 | 10/2008 | Ahn | |
| 2008/0268904 A1 | 10/2008 | Tanaka | |
| 2008/0298303 A1* | 12/2008 | Tsirtsis | H04L 69/14 370/328 |
| 2009/0201813 A1* | 8/2009 | Speight | 370/235 |
| 2009/0252200 A1 | 10/2009 | Dohler et al. | |
| 2009/0253417 A1 | 10/2009 | Soma et al. | |
| 2009/0325479 A1 | 12/2009 | Chakrabarti et al. | |
| 2010/0002645 A1* | 1/2010 | Ke et al. | 370/329 |
| 2010/0020753 A1 | 1/2010 | Fulknier et al. | |
| 2010/0074119 A1 | 3/2010 | Krishnaswamy | |
| 2010/0135266 A1 | 6/2010 | Karaoguz et al. | |
| 2010/0150161 A1 | 6/2010 | Saksena et al. | |
| 2010/0238803 A1* | 9/2010 | Racz et al. | 370/235 |
| 2010/0315973 A1 | 12/2010 | Hirano et al. | |
| 2010/0329248 A1 | 12/2010 | Eggert et al. | |
| 2011/0055901 A1 | 3/2011 | Karaoguz et al. | |
| 2011/0149739 A1 | 6/2011 | Sarkar | |
| 2011/0235578 A1 | 9/2011 | Laganier et al. | |
| 2011/0252151 A1 | 10/2011 | Lu et al. | |
| 2011/0296006 A1* | 12/2011 | Krishnaswamy | H04L 29/12952 709/224 |
| 2012/0020248 A1* | 1/2012 | Granlund et al. | 370/254 |
| 2012/0236801 A1* | 9/2012 | Krishnaswamy | H04W 76/026 370/329 |
| 2012/0243441 A1* | 9/2012 | Reunamaki | H04L 67/14 370/255 |
| 2012/0320752 A1* | 12/2012 | Gouache et al. | 370/237 |
| 2012/0321008 A1 | 12/2012 | Krishnaswamy et al. | |
| 2012/0331160 A1* | 12/2012 | Tremblay et al. | 709/228 |
| 2013/0031256 A1* | 1/2013 | Hampel | H04L 69/16 709/227 |
| 2013/0115973 A1* | 5/2013 | Wigren et al. | 455/456.2 |

FOREIGN PATENT DOCUMENTS

| | | |
|---|---|---|
| EP | 2495927 A1 | 9/2012 |
| JP | 2007043678 A | 2/2007 |
| JP | 2008278197 A | 11/2008 |
| JP | 2009253752 A | 10/2009 |
| JP | 2009296084 A | 12/2009 |
| JP | 2010504047 A | 2/2010 |
| WO | 2005011173 A2 | 2/2005 |
| WO | WO-2008078633 A1 | 7/2008 |
| WO | 2010008615 A1 | 1/2010 |
| WO | WO2010027858 A2 | 3/2010 |
| WO | 2011041798 | 4/2011 |

OTHER PUBLICATIONS

"Resilient Overlay Networks", David Andersen, Hari Balakrishnan, Frans Kaashoek, and Robert Morris Mit Laboratory for Computer Science, ron @ nms.lcs.mit.edu, 2001, http:llnms.lcs.mit.edulronl, ACM SIGOPS Operating Systems Review Homepage, vol. 35 Issue 5, Dec. 2001, pp. 131-145.*

A Transport Layer Approach for Achieving Aggregate Bandwidths on Multi-homed Mobile Hosts Hung-Yun Hsieh and Raghupathy Sivakumar, School of Electrical and Computer Engineering Georgia Institute of Technology, Atlanta, GA 30332, USA, {hyhsieh, siva}@ece.gatech.edu, MOBICOM'02, Sep. 23-28, 2002, Atlanta, Georgia, USA, pp. 83 to pp. 94.*

Stefan Savage et al., titled "The end-to-end effects of Internet path selection", published in Proceeding SIGCOMM '99 Proceedings of the conference on Applications, technologies, architectures, and protocols for computer communication pp. 289-299 ACM, table of contents ISBN:1-58113-135-6 doi>10.1145/316188.316233.*

Ming Zhang et al., titled A Transport Layer Approach for Improving End-to-End Performance and Robustness Using Redundant Paths, published in: Proceeding ATEC '04 Proceedings of the annual conference on USENIX Annual Technical Conference pp. 8-8, USENIX Association Berkeley, CA, USA © 2004, table of contents, 2004.*

David Andersen et al., titled "Resilient Overlay Networks", published in Proceeding SOSP '01 Proceedings of the eighteenth ACM symposium on Operating systems principles pp. 131-145 ACM, table of contents ISBN:1-58113-389-8 doi>10.1145/502034.502048.*

Hung-Yun Hsieh et al., titled "A transport layer approach for achieving Aggregate Bandwidths on Multi-homed Mobile hosts", published in Journal Wireless Networks archive vol. 11 Issue 1-2, Jan. 2005 pp. 99-114 Kluwer Academic Publishers Hingham, MA, USA table of contents doi>10.1007/s11276-004-4749-6.*

Zhang et al.), titled "A transport layer approach for improving end-to-end performance and robustness using redundant paths" (Zhang hereinafter) was presented in Conference Proceedings at USENIX '04 Annual Technical Conference, in Boston, MA on Jun. 27-Jul. 2, 2004.*

Baccelli, F.; Chaintreau, A.; Zhen Liu; Riabov, A., "The one-to-many TCP overlay: a scalable and reliable multicast architecture," INFOCOM 2005. 24th Annual Joint Conference of the IEEE Computer and Communications Societies. Proceedings IEEE, vol. 3, No., pp. 1629,1640 vol. 3, Mar. 13-17, 2005 doi: 10.1109/INFCOM.2005. 1498445.*

M. Mathis, S. Floyd, A. Romanow, J. Mandavi, Request for Comments: 2018; Titled "TCP Selective Acknowledgment Options"; Oct. 1996.*

Baccelli, F.; Chaintreau, A.; Zhen Liu; Riabov, A., (Baccelli et al.), titled "The one-to-many TCP overlay: a scalable and reliable multicast architecture " (Baccelli hereinafter) was presented in INFOCOM 2005. 24th Annual Joint Conference of the IEEE Computer and Communications Societies, Proceedings IEEE, vol. 3, No., pp. 1629,1640 vol. 3, 13-17.*

Baccelli, F.; Chaintreau, A.; Zhen Liu; Riabov, A., (Baccelli et al.), titled "The one-to-many TCP overlay: a scalable and reliable multicast architecture " (Baccelli hereinafter) was presented in INFOCOM 2005. 24th Annual Joint Conference of the IEEE Computer and Communications Societies, Proceedings IEEE, vol. 3, No., p. 1629,1640 vol. 3, 13-17.*

M. Mathis, S. Floyd, A. Romanow, J. Mandavi, Request for Comments: 2018, titled "Request for Comments: 2018" (2018 hereinafter) Oct. 1996.*

Ming Zhang, Junwen Lai, Arvind Kirshnamurthy, Larry Peterson and Randolph Wang, (Zhang et al.), titled "A transport layer approach for improving end-to-end performance and robustness using redundant paths" (Zhang hereinafter) was presented in Conference Proceedings at USENIX '04 Annual Technical Conference, in Boston, MA on Jun. 27-Jul. 2, 2004.*

Baccelli, F.; Chaintreau, A.; Zhen Liu; Riabov, A., (Baccelli et al.), titled "The one-to-many TCP overlay: a scalable and reliable multicast architecture " was presented in INFOCOM 2005. 24th Annual Joint Conference of the IEEE Computer and Communications Societies, Proceedings IEEE, vol. 3, No., p. 1629,1640 vol. 3, Mar. 13-17, 2005.*

M. Mathis, S. Floyd, A. Romanow, J. Mandavi, Request for Comments: 2018, titled "Request for Comments: 2018" (2018 hereinafter), Oct. 1996.*

(56) References Cited

OTHER PUBLICATIONS

David G. et al., "Best-Path vs. Multi-Path Overlay Routing", Proc. ACM SIGCOMM Internet Measurement Conference, 2003, pp. 91-100.
Feilner,"OpenVPN 101: introduction to OpenVPN", Telindus High-Tech Institute, Stijn Huyghe, Packt Publishing, Apr. 2006 25 pages.
Ford, et al., "Architectural Guidelines for Multipath TCP Development draft-ietf-mptcp-architecture-00", Internet-Draft, MPTCP Architecture, Feb. 2010, pp. 1-25.
Ford, "TCP Extensions for Multipath Operation with Multiple Addresses draft-ford-mptcp-multiaddressed-03", Internet Engineering Task Force, Mar. 8, 2010, University College London, 33 pages.
Hasegawa Y, et al.,"Improved data distribution for multipath TCP communication", IEEE Globecom, 2005, pp. 271-275.
Jardine, et al., "A hybrid architecture for massively multiplayer online games" Proceedings of the 7th ACM SIGCOMM Workshop on Network and System Support for Games, 2008, pp. 60-65.
Rojviboonchai K., et al., "An Evaluation of Multi-path Transmission Control Protocol (M/TCP) with Robust Acknowledgement Schemes", IEICE Trans Commun, 2004, pp. 2699-2707, vol. E87-B; No. 9.
Stewart, "Stream Control Transmission Protocol", Network Working Group, Sep. 2007, 153 pages.
Agrawal, P., et al., "MTorrent: A multicast enabled BitTorrent protocol", Communication Systems and Networks (C0MSNETS), 2010 Second International Conference on, IEEE, Piscataway, NJ, USA, Jan. 5, 2010 ', pp. 1-10, XP031670909, ISBN: 978-1-4244-5487-7.
Han H., et al., "Multi-Path TCP: A Joint Congestion Control and Routing Scheme to Exploit Path Diversity in the Internet", IEEE/ACM Transactions on Networking, IEEE/ACM, New York, NY, US, vol. 14, No. 6, Dec. 1, 2G06 (Dec. 1, 2006), pp. 1260-1271, XP011151888, ISSN: 1063-6692, DOI: 10.1109/TNET.2006. 886738 p. 1262, left-hand column, line 19-line 32.
Huszak A., et al., "Content-aware interface selection method for multi-path video streaming in best-effort networks", Telecommunications, 2009. ICT '09. International Conference on, IEEE, Piscataway, NJ, USA, May 25, 2009, pp. 196-201, XP031485724, ISBN: 978-1-4244-2936-3 p. 197, left-hand column, line 7-p. 198, col. 18, line 21.
International Search Report and Written Opinion—PCT/US2012/055558—ISA/EPO—Mar. 6, 2013

Li Y., et al., "SmartTunnel: A Multipath Approach to Achieving Reliability in the Internet", Department of Computer Sciences, University of Texas at Austin Internet Article, Jul. 31, 2006, pp. 1-13, XP002672146, Austin Retrieved from the Internet: URL:http://www.es.utexas.edufftp/pub/techreports/tr06-38.pdf [retrieved on Mar. 21, 2012] p. 2, right-hand column, line 12-line 34; figure 1 p. 11, left-hand column, line 4-line 14 p. 3.
Scharf M et al., "MCTCP: A Multipath Transport Shim Layer", Global Telecommunications Conference (GLOBECOM 2011), 2011 IEEE, IEEE, Dec. 5, 2011, pp. 1-5, XP032119220, DOI: 10.1109/GL0C0M.2011.6134021 ISBN: 978-1-4244-9266-4.
Sheriff I., et al., "Multipath Selection in Multi-radio Mesh Networks", Broadband Communications, Networks Systems, 2006. Broadnets 2006. 3rd International Conference on, IEEE, Piscataway, NJ, USA, Oct. 1, 2006, pp. 1-11, XP031155972, ISBN: 978-1-4244-0424-7.
Stoica, I., et al., "Internet Indirection Infrastructure" IEEE / ACM Transactions on Networking, IEEE / ACM, New York, NY, US, vol. 12, No. 2, Apr. 1, 2004 pp. 205-218, XP001193285, ISSN: 1063-6692, DOI: 10.1109/TNET.2004.826279.
Warabino, T., et al., "Overhead Reduction of Internet Indirection Infrastructure (13) for Future Mobile and Wireless Communications", IEICE Transactions on Communications, Communications Society, Tokyo, JP, vol. E90B, No. 4, Apr. 1, 2007', pp. 761-768, XP001541830, ISSN: 09168516, DOI: 10.1093/IETC0M/E90-B.4. 761.
Wischik D, et al., "Design, implementation and evaluation of congestion control for multipath TCP", proceedings of Usen.ix NSDI, 2011,, Apr. 1, 2011, XP055045890, Boston, USA Retrieved from the Internet: URL:http://static.usenix.org/event/nsdi11/tech/full_papers/Wischi k.pdf [retrieved on Nov. 28, 2012].
Ford A., et al., "Architecture guideline for multipath TCP Development", Internet Engineering Task Force (IETF), Request for Comments: 6182, Mar. 2011, pp. 1-28, ISSN: 2070-1721, URL, http://tools.ietf.org/pdf/rfc6182.pdf.
Tonouchi M., "A Study on retransmission control of multipath-extended TCP", IPSJ SIG Technical Reports, vol. 2004, No. 21, Japan, Information Processing Society of Japan, Mar. 5, 2004.
Tonouchi M., "Design of Dynamic Multi Link TCP for Mobile Communication", Proceedings of Multimedia, Distributed, Cooperative and Mobile (DICOMO) Symposium, 1997-2006 Ver.1.1 [DVD-ROM], Japan, The Information Processing Society of Japan, vol. 2003, Jun. 2003.

* cited by examiner

Comparison of Standard TCP and MPTCP Protocol Stacks

DYNAMIC SUBFLOW CONTROL FOR A MULTIPATH TRANSPORT CONNECTION IN A WIRELESS COMMUNICATION NETWORK

BACKGROUND

1. Field

Aspects of the present disclosure relate generally to wireless communications, and more particularly, to multipath transport control in a wireless communication network.

2. Background

The transmission control protocol (TCP) is a transport protocol frequently used for non-real-time services such as HTTP for web browsing, FTP, IMAP, etc. A TCP connection can be set up between a client, e.g., user equipment (UE), and a server. TCP is above the IP layer, and uses retransmissions, flow control, and congestion control to improve the reliability of the IP layer.

For flow control, the receiver side in a TCP connection controls the transmitter so that only as much data is sent as the receiver has a buffer capacity for. Thus, the transmitter side dynamically adjusts the transmission rate in accordance with acknowledgements from the receiver. Further, congestion control at the transmitter side may use a congestion window (CW) controlled by slow start and congestion avoidance algorithms and an offered window with the size the receiver has a buffer for, to determine the amount of data the transmitter side can transmit.

In a modern network such as the Internet, hosts are often connected by multiple paths, where each path is defined by a source and destination address pair. For example, a mobile station may include multiple wireless links such as WWAN links for two or more protocols such as W-CDMA, LTE, CDMA2000, and WiMAX, and possibly a WLAN or WPAN link. Similarly, a network server may have any number of links to the network.

However, TCP restricts communications to a single path per transport connection. To improve the efficiency of resource usage within the network, a multipath TCP protocol has been described in order to enable these multiple paths able to be concurrently used by splitting the information over multiple transport paths. By using more than one path, multipath TCP can enhance user experience through improved resilience to network failure and increased throughput.

The information being routed over the TCP connection includes data and control signaling. Control messages may include any information exchange to setup up or maintain multiple paths, such as inquiring about additional IP addresses to set up a multipath connection. Data information includes application layer data being communicated over multipath transport.

While multipath TCP provides various improvements, there remains a desire to further improve data and control signaling delivery, particularly for connections over multiple paths including wireless links which may have independently varying signal qualities. That is, with such a multipath connection, the exchange of control messages may be hindered when the path carrying those control messages fails due to a deep fade on the corresponding wireless link. Here, multipath session setup and maintenance can be delayed. Further, when data on one path fails, starvation may occur on another, good path, hindering application performance and user experience.

SUMMARY

In order to advance the development of multipath transport control in a wireless communication network, a multipath transport protocol such as multipath TCP can utilize metrics corresponding to link-layer conditions of one or more wireless links used on different paths to dynamically allocate data and control signaling over respective paths. In this way, a multipath TCP connection can be more reliable and efficient as flow control and data flow are enhanced.

In one aspect of the disclosure, a method of wireless communication over a multipath TCP connection includes communicating over a first subflow on a first path that comprises a first wireless link, communicating over a second subflow on a second path, and providing a health metric corresponding to a quality of the first wireless link, wherein the health metric is provided on a third subflow on at least one of the first path or the second path.

In another aspect of the disclosure, a method of wireless communication over a multipath TCP connection includes receiving a health metric corresponding to a quality of a first wireless link, allocating a first portion of a TCP flow to a first subflow on a first path that comprises the first wireless link, and allocating a second portion of the TCP flow to a second subflow on a second path, wherein an amount of the first portion and an amount of the second portion is determined in accordance with the health metric.

In yet another aspect of the disclosure, a method of wireless communication over a multipath TCP connection including a plurality of paths is provided. Here, the method includes transmitting a first portion of a data flow over a first subflow on a first path of the plurality of paths, transmitting a second portion of a data flow over a second subflow on a second path of the plurality of paths, and transmitting control information corresponding to the first subflow and the second subflow over at least two paths of the plurality of paths, wherein the control information is duplicated over each of the at least two paths.

In still another aspect of the disclosure, an apparatus for wireless communication over a multipath TCP connection includes means for communicating over a first subflow on a first path that comprises a first wireless link, means for communicating over a second subflow on a second path, and means for providing a health metric corresponding to a quality of the first wireless link, wherein the health metric is provided on a third subflow on at least one of the first path or the second path.

In still another aspect of the disclosure, an apparatus for wireless communication over a multipath TCP connection, includes means for receiving a health metric corresponding to a quality of a first wireless link, means for allocating a first portion of a TCP flow to a first subflow on a first path that comprises the first wireless link, and means for allocating a second portion of the TCP flow to a second subflow on a second path, wherein an amount of the first portion and an amount of the second portion is determined in accordance with the health metric.

In still another aspect of the disclosure, an apparatus for wireless communication over a multipath TCP connection including a plurality of paths is provided. Here, the apparatus includes means for transmitting a first portion of a data flow over a first subflow on a first path of the plurality of paths, means for transmitting a second portion of a data flow over a second subflow on a second path of the plurality of paths, and means for transmitting control information corresponding to the first subflow and the second subflow over at least two paths of the plurality of paths, wherein the control information is duplicated over each of the at least two paths.

In still another aspect of the disclosure, a computer program product for wireless communication over a multipath TCP connection is provided. Here, the computer program product includes a computer-readable medium having instructions for causing a computer to communicate over a first subflow on a first path that comprises a first wireless link, instructions for causing a computer to communicate over a second subflow on a second path, and instructions for causing a computer to provide a health metric corresponding to a quality of the first wireless link, wherein the health metric is provided on a third subflow on at least one of the first path or the second path.

In still another aspect of the disclosure, a computer program product for wireless communication over a multipath TCP connection is provided. Here, the computer program product includes a computer-readable medium having instructions for causing a computer to receive a health metric corresponding to a quality of a first wireless link, instructions for causing a computer to allocate a first portion of a TCP flow to a first subflow on a first path that comprises the first wireless link, and instructions for causing a computer to allocate a second portion of the TCP flow to a second subflow on a second path, wherein an amount of the first portion and an amount of the second portion is determined in accordance with the health metric.

In still another aspect of the disclosure, a computer program product for wireless communication over a multipath TCP connection including a plurality of paths is provided. Here, the computer program product includes a computer-readable medium having instructions for causing a computer to transmit a first portion of a data flow over a first subflow on a first path of the plurality of paths, instructions for causing a computer to transmit a second portion of a data flow over a second subflow on a second path of the plurality of paths, and instructions for causing a computer to transmit control information corresponding to the first subflow and the second subflow over at least two paths of the plurality of paths, wherein the control information is duplicated over each of the at least two paths.

In still another aspect of the disclosure, an apparatus for wireless communication over a multipath TCP connection includes at least one processor and a memory coupled to the at least one processor. Here, the at least one processor is configured to communicate over a first subflow on a first path that comprises a first wireless link, to communicate over a second subflow on a second path, and to provide a health metric corresponding to a quality of the first wireless link, wherein the health metric is provided on a third subflow on at least one of the first path or the second path.

In still another aspect of the disclosure, an apparatus for wireless communication over a multipath TCP connection includes at least one processor and a memory coupled to the at least one processor. Here, the at least one processor is configured to receive a health metric corresponding to a quality of a first wireless link, to allocate a first portion of a TCP flow to a first subflow on a first path that comprises the first wireless link, and to allocate a second portion of the TCP flow to a second subflow on a second path, wherein an amount of the first portion and an amount of the second portion is determined in accordance with the health metric.

In still another aspect of the disclosure, an apparatus for wireless communication over a multipath TCP connection including a plurality of paths is provided. Here, the apparatus includes at least one processor and a memory coupled to the at least one processor. The at least one processor is configured to transmit a first portion of a data flow over a first subflow on a first path of the plurality of paths, to transmit a second portion of a data flow over a second subflow on a second path of the plurality of paths, and to transmit control information corresponding to the first subflow and the second subflow over at least two paths of the plurality of paths, wherein the control information is duplicated over each of the at least two paths.

These and other aspects of the invention will become more fully understood upon a review of the detailed description, which follows.

DETAILED DESCRIPTION

Figure 1:
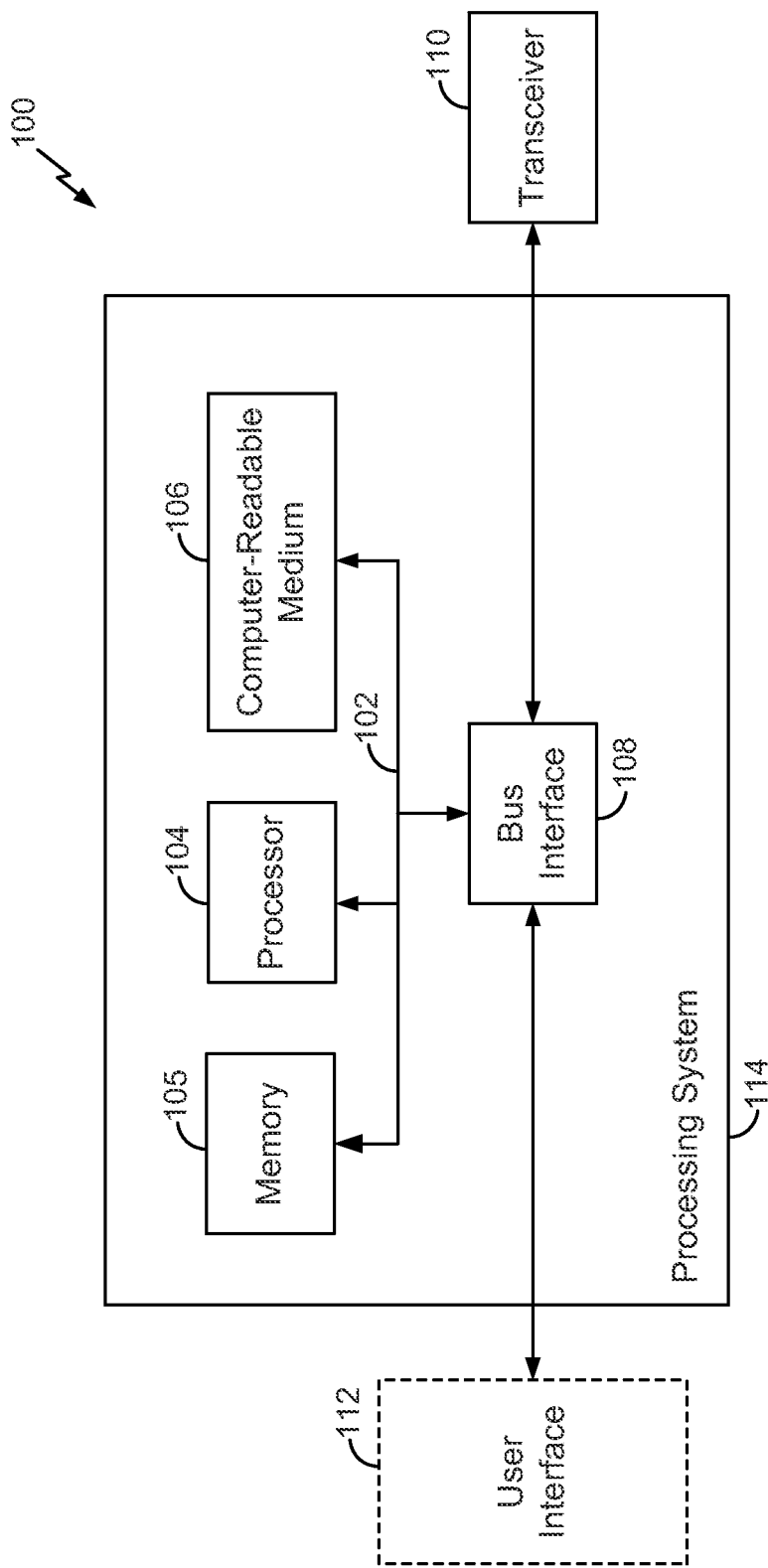
FIG. 1 is a block diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Examples of apparatuses suitable for incorporating various aspects of the present disclosure include, but are not limited to, a user equipment (UE) capable of operating in a wireless network, a WWAN client, etc. A UE may be referred to as a wireless terminal, a mobile phone, a user terminal, a mobile station, a mobile device, a subscriber station, a wireless device, a wireless node, a terminal, an access terminal, a node, a handheld device, a tablet, or some other suitable terminology. Further examples of apparatuses suitable for incorporating various aspects of the present disclosure include, but are not limited to, a server or a computer with any suitable network connection. Such a computer may be referred to as a host, a node, or some other suitable terminology. The various concepts described throughout this disclosure are intended to apply to all suitable apparatuses regardless of their specific nomenclature.

In a modern network such as the Internet, a plurality of hosts, or computers that use the network, communicate with one another over one or more communication paths. Here, a path broadly refers to a sequence of links between a sender and a receiver of the data, and may be designated in accordance with a source address and a destination address. The source and destination address pair may be designated by IP addresses, such as ($IP_{source}$, $IP_{destination}$). The sequence of links between the respective source and destination hosts may include any number of separate physical links, and recently may frequently include at least one wireless air interface such as a cellular connection between mobile user equipment and a base station. That is, a path may include a wireless wide area network (WWAN) connection.

In various aspects of the present disclosure, the term "subflow" can include an overlay at the application layer, or a segment at the transport layer. That is, as discussed in further detail below, an application layer connection or a transport layer connection may be referred to as a subflow. In any case, a subflow refers to a flow operating over an individual path.

Multipath transport protocols provide support for multiple subflows to be managed at the transport layer between a source and a destination on a network such as the Internet. Here, a multipath transport-layer subflow may appear to the network to be a conventional transport-layer flow, but in fact forms only a part of a larger multipath transport connection.

Examples of multipath transport protocols known to those skilled in the art include multipath TCP (MPTCP) and the stream control transmission protocol (SCTP). In particular, broad interest has been directed to multipath TCP for utilizing multiple paths on the Internet between a source and a destination to aggregate performance across the paths. Nonetheless, while various aspects of the present disclosure provide details relating to particular implementations utilizing multipath TCP, the broad concepts disclosed herein are broadly applicable to any multipath transport protocol.

Figure 2:
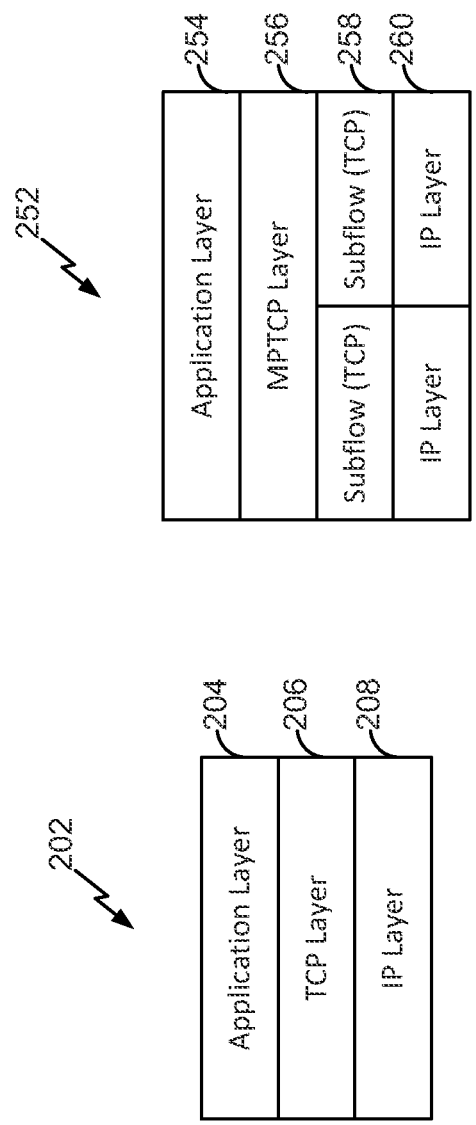
FIG. 2 is a schematic illustration comparing protocol stacks for standard TCP and multipath TCP.

FIG. 2 is a schematic diagram illustrating protocol stacks for a conventional TCP connection 202 and a conventional multipath TCP connection 252 in accordance with the IETF Internet draft, *Architectural Guidelines for Multipath TCP Development*, which is publically available and incorporated herein by reference in its entirety. In the TCP connection 202, an application layer 204 utilizes a TCP layer 206 to communicate with a single IP layer 208 to manage a flow across a single path. In contrast, the multipath TCP connection 252 utilizes a plurality of subflows 258, each of which appears to the network to be a conventional TCP session such as the TCP connection 202, to send data over multiple IP layer connections 260. These subflows 258 are managed by a multipath TCP (MPTCP) layer 256, which is an extension layer below the application layer 254 and configured to manage the multiple TCP subflows below it. The multipath TCP layer 256 may be configured to appear to the application layer 254 to be a conventional TCP layer, so that application-layer changes may not be needed. Further, the multipath TCP layer 256 may be configured to handle functions such as path management, packet scheduling, providing of a subflow interface, and congestion control for the plurality of subflows 258.

Figure 3:
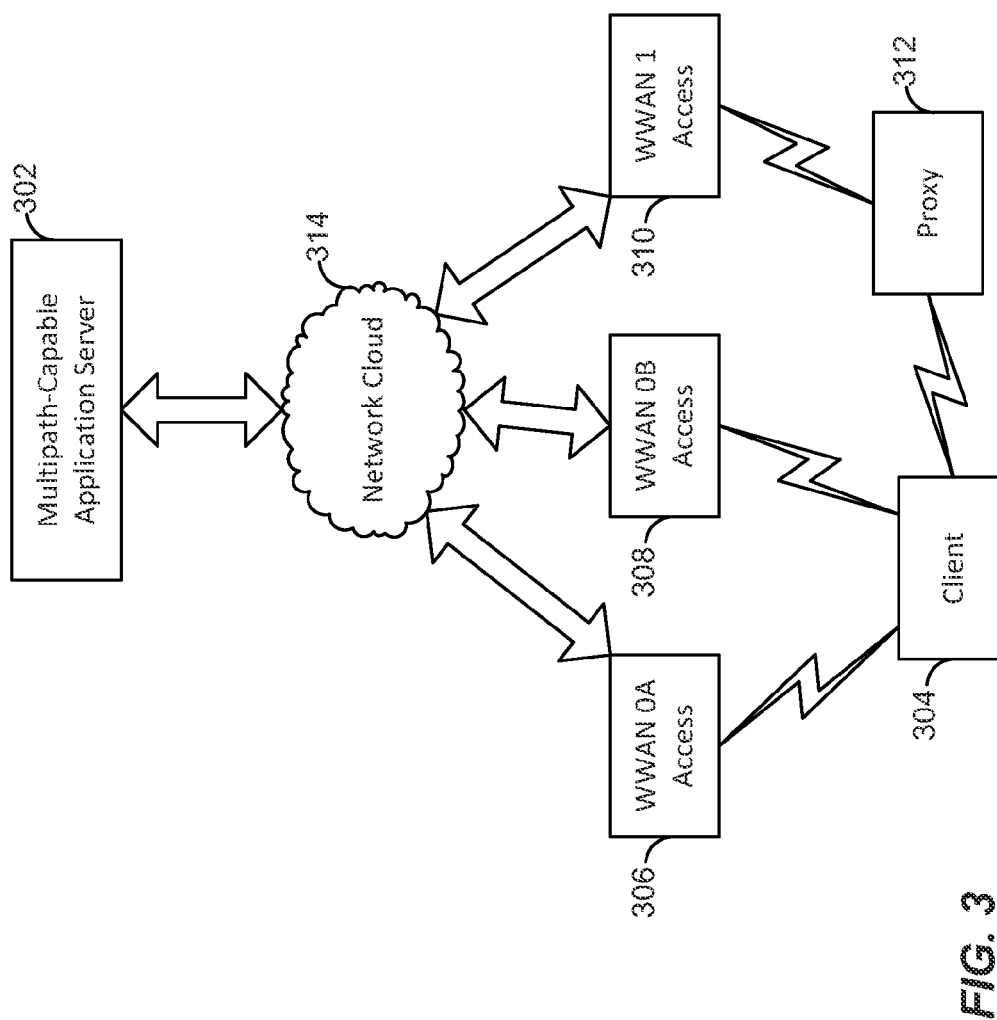
FIG. 3 is a simplified block diagram illustrating a multipath TCP connection in a wireless communication network.

FIG. 3 is a simplified block diagram illustrating an exemplary network including multiple paths between an application server 302 and a client device 304, in accordance with some aspects of the present disclosure. Here, a multipath TCP-capable client 304 is directly connected to a multipath TCP-capable application server 302 (directly connected, as opposed to a connection utilizing tunneling, described below and illustrated in FIGS. 8-9) by way of one or more WWAN access points 306, 308; and a proxy or helper node 312 which may be coupled to a WWAN access point 310. In the illustrated example, each of the WWAN access points 306, 308, and 310 is coupled to a network cloud 314, such as the Internet, to which the application server 302 is also communicatively coupled.

Here, as an illustrative example, the client 304 includes dual WWAN modems for communicating with two WWAN access points 306 and 308. Examples of WWAN technologies may include but are not limited to: Long Term Evolution (LTE), High Speed Packet Access (HSPA) and its evolutions, CDMA2000, EV-DO Rev. A/B, Worldwide Interoperability for Microwave Access (WiMAX), UMTS, GPRS/EDGE, etc. In general, each of a plurality of WWAN modems in a mobile platform such as the client 304 can access a WWAN, so that a mobile platform may be capable of aggregating bandwidth using each of the WWAN modems available to it. The available modems associated with the user may reside on one device, i.e., the client 304. Additional modems may be present on one or more proxy or helper devices 312, which may dynamically associate when the devices 304 and 312 come within wired or wireless proximity of each other.

Further, the client 304 may include a WPAN modem for communicating with a proxy 312, wherein the proxy 312 includes a WWAN modem for communicating with a third WWAN access point 310. In one example, the WPAN modem for communicating with the proxy 312 may be a Bluetooth or other suitable low-power communication interface. Thus, the client 304 and the proxy 312 may coordinate together over wired or wireless links (e.g., traffic merging or splitting can be performed on one of the devices), such as WPAN links.

In some aspects of the disclosure, each of the wireless air interfaces with the WWAN access points 306 and 308, and the low-power air interface with the proxy 312, may be identified by an address, e.g., an IP address. For example, the interface between the client 304 and the WWAN 0A access point 306 may be identified by IP1, the interface between the client 304 and the WWAN 0B access point 308 may be identified by IP2, and the interface between the client 304 and the proxy 312 may be identified by IP3. This way, assuming the multipath-capable application server 302 is identified with three addresses IP4, IP5, and IP6, the client 304 may communicate with the application server 302 utilizing a multipath TCP connection that includes three subflows, each subflow over a respective path, namely, (IP1, IP4); (IP2, IP5); and (IP3, IP6). Of course, some of the multiple paths from the client 304 and the application server 302 may terminate at the same IP address, for example, such that some of the multiple paths may be identified by the address pairs (IP1, IP4) and (IP2, IP4).

Figure 4:
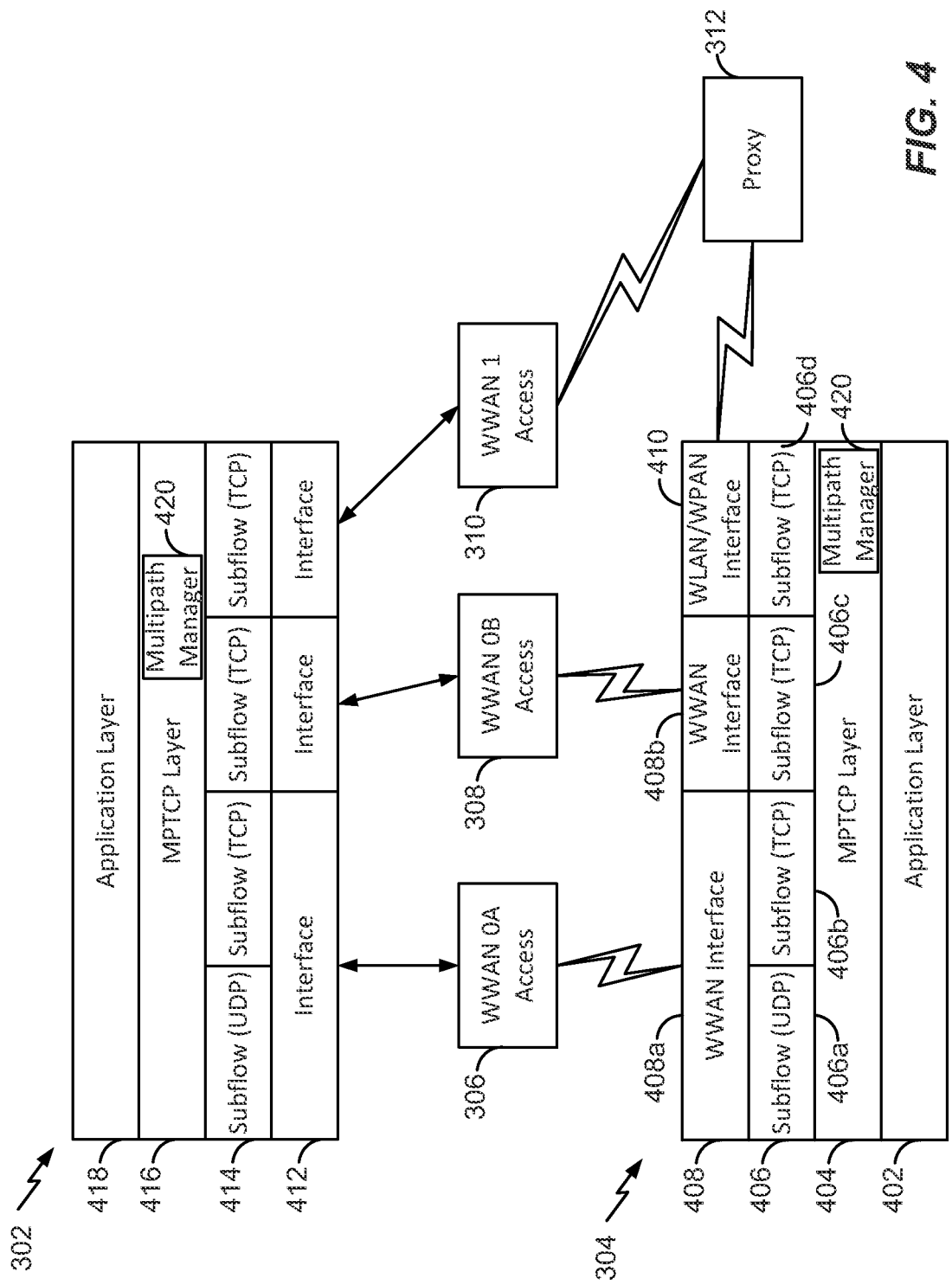
FIG. 4 is a schematic diagram illustrating protocol stacks in an example client-server communication over a multipath TCP connection.

FIG. 4 illustrates some of the hosts illustrated in FIG. 3, in a schematic diagram illustrating a portion of the protocol stack in certain ones of the nodes. Client may be any suitable user equipment such as a mobile phone, a tablet, a personal digital assistant (PDA), a personal computer including one or more WWAN access cards, etc. In an aspect of the present disclosure, the client 304 includes a protocol stack having an application layer 402, a multipath TCP layer 404, a plurality of TCP subflows 406, one or more WWAN interfaces 408, and one or more WLAN or WPAN interfaces 410. The WWAN interfaces 408 and the WLAN/WPAN interface 410 represent an IP layer, a data link layer, and a physical layer below the TCP layers 406. The particular interface illustrated for the client 304 is merely exemplary in nature, and in various aspects of the disclosure the client 304 may include any number of suitable wired or wireless communication interface(s) for communicating with a network cloud.

In the illustrated example, the multipath TCP layer 404 in the client 304 manages four subflows 406a, 406b, 406c, and 406d. Here, the first subflow 406a is a UDP subflow, managed by the multipath TCP layer 404. In other aspects of the present disclosure, described in further detail below, a UDP subflow may be an application-layer overlay. The second subflow 406b is a TCP subflow. Here, the first subflow 406a and the second subflow 406b utilize a first WWAN interface 408a to communicate with the first WWAN access point 306. That is, in an aspect of the disclosure, a plurality of subflows may utilize one physical communication interface. The third subflow 406c utilizes a second WWAN interface 408b to communicate with the second WWAN access point 308. The fourth subflow 406d utilizes the WLAN/WPAN interface to communicate with the proxy 312, which in turn communicates with the third WWAN access point 310. Of course, in various examples, the proxy 312 may utilize any suitable wired or wireless interface for establishing a portion of a path between the client 304 and the application server 302.

The proxy 312, which may be referred to as a helper node, may be any suitable device such as a mobile phone, a tablet, a PDA, a personal computer, etc., and in some examples may be the same type of device as the client device 304. The proxy 312 may be configured to establish a connection with the client 304 such that the proxy 312 can utilize the relatively higher bandwidth WWAN interface which, in aggregation with the WWAN interface(s) of the client 304, can provide increased data speeds to the client device 304.

The WWAN access points 306, 308, and 310 can utilize the same or different communication standards, and may be base stations, Node Bs, eNode Bs, base transceiver stations (BTS), or any other suitable access point for WWAN communication.

In the example illustrated in FIGS. 3 and 4, the application server 302 is a multipath-capable application server, including a multipath TCP layer 416 for enabling the application layer 418 to communicate through a plurality of TCP subflows 414. In the illustrated example, the application server 302 includes a plurality of interface layers 412 corresponding to the number of WWAN access points 306, 308, and 310, however, in various examples within the scope of the present disclosure any number of interface(s) 412 may be utilized to communicate with a network.

In accordance with various aspects of the present disclosure, one or both of the multipath TCP layers 416 or 404 may include a multipath manager 420. For convenience of description, the following description will refer to the multipath manager 420 included in the multipath TCP layer 416 of the application server 302, however, those skilled in the art will comprehend that some or all of the described features may apply equally to the multipath manager 420 included in the multipath TCP layer 404 of the client device 304.

The multipath manager 420 is configured to manage one or more subflows, in such a way that the multipath TCP layer 416 appears to the application layer 418 as a single TCP connection. Further, the plurality of subflows appear to lower layers as standard TCP sessions (or in the case that one of the subflows is a UDP subflow as illustrated at 406a, the respective subflow may appear to lower layers as a standard UDP session), in order to retain network compatibility without necessitating changes specific for handling multipath TCP.

In an aspect of the disclosure, the multipath manager 420 includes functional components including a path management function, a packet scheduling function, a subflow interface, and congestion control. The path management function may detect and use the multiple paths between the client 304 and the remote host, in this case, the application server 302. The packet scheduling function breaks the flow of packets received from the application layer 418 into segments, which are to be transmitted on one of the available subflows 414. That is, the packet scheduling function may segment the application-level data into connection-level segments, and may add a connection-level sequence number to those segments. The connection-level sequence number may be referred to as a global sequence number, to be distinguished from the subflow-level sequence number discussed in further detail below.

The subflow interface function of the multipath manager 420 may take the allocated segments from the packet scheduling function, and transmit them over a specified subflow. The congestion control function of the multipath manager 420 generally coordinates congestion control among the plural subflows 414, by helping the packet scheduling function to schedule which of the scheduled packets to send, and at what rate, and on which of the subflows.

In an aspect of the present disclosure, the amount of data allocated to respective subflows by the multipath manager 420 can be determined in accordance with a health metric. Here, a health metric can be determined in accordance with a function of various factors, such as: wireless link conditions for one or more of the paths that includes a wireless link; a round trip time (RTT); a congestion window (CW); a number of packets in a retransmission queue corresponding to a subflow; etc. In some examples, the health metric may include a time stamp or count index associated with the reported metric, so that the most recently received health metric can be utilized, and older versions of the health metric can be discarded if desired or any duplicate versions of the health metric can be discarded. Further, the health metric may include an indicator associated with the path corresponding to which the health metric is reported. In some examples the health metric may include information corresponding to a single path, while in other examples the health metric may include information corresponding to a plurality of paths. Here, when reporting information corresponding to a plurality of paths, the path indicator and the count index or time stamp associated with each path may be sent along with the health metric for the corresponding path. In an example wherein health metrics for all paths is provided, the count index or the time stamp may be associated with the entire message, with path indicators followed by health metric information for each path.

Figure 5:
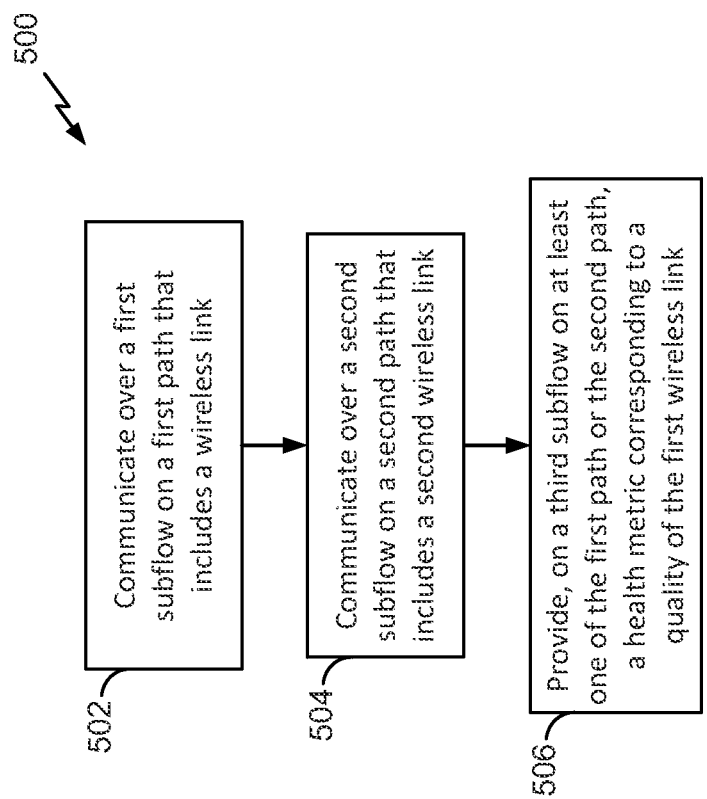
FIG. 5 is a flow chart illustrating a method of multipath TCP communication utilizing a health metric corresponding to a quality of at least one wireless link.

FIG. 5 is a flow chart illustrating an exemplary process 500 for wireless communication in accordance with an aspect of the present disclosure for a multipath TCP connection. The process 500 may be implemented by the multipath manager 420, by a processing system 114 (see FIG. 1), or by any other suitable means for carrying out the described functions.

In block 502, the process may communicate over a first subflow on a first path that includes a wireless link. For example, the multipath manager 420 may communicate over the subflow 406b, on a first path that includes the wireless link between the WWAN interface 408a and the WWAN access point 306. In block 504, the process may communicate over a second subflow on a second path, wherein the second path may include a second wireless link. For example, the multipath manager 420 may communicate over the subflow 406c, on a second path that includes the wireless link between the WWAN interface 408b and the WWAN access point 308.

In block 506, the process may provide, on a third subflow on at least one of the first path or the second path, a health metric that corresponds to a quality of the first wireless link. Here, the health metric may further correspond to the quality of the second wireless link. For example, the third subflow may correspond to the UDP subflow 406a on the first path. In some examples, the third subflow may be the same subflow as one of the first subflow or the second subflow; and in other examples the third subflow may be a separate subflow, different from either the first subflow or the second subflow. In still other examples, the health metric may be sent on a plurality of the subflows, e.g., on both the first subflow and the second subflow, wherein duplicate health metric messages may be discarded. In an example where the third subflow, on which the health metric is provided, is the same subflow as one of the first or second subflows onto which data packets are sent, the health metric may be provided in any suitable format such as, for example, a proprietary transport layer message.

That is, in some aspects of the present disclosure, the transmission of control signaling, such as the health metric, may utilize a separate subflow established for control signaling packets. The establishment of a separate subflow for the control signaling packets may provide for a reduced likelihood of delays, queue backlogs, or TCP congestion on the subflows utilized for the data. Here, the subflow for the control signaling may be on the same path as one or more subflows for data packets, or on a different path than those utilized for data packets. In the illustrated example, subflow 406a utilizes the same path as the subflow 406b, i.e., including the wireless link between a first wireless interface 408a and a WWAN access point 306. Subflows 406b, 406c, and 406d may be designated for data packets corresponding to the control packets sent on subflow 406a.

As one example, without limitation, subflow 406a may be a UDP subflow established to carry the control signaling packets such as the health metric. In this way, by utilizing UDP for the control signaling, as it is known to those of ordinary skill in the art, the transmission of time-sensitive control information may be expedited at the possible expense of reliability. That is, because UDP lacks some of the error correction and reliability safeguards afforded to TCP, less overhead is required and thus the control packets utilizing this protocol may arrive more quickly. Here, in some aspects of the disclosure, redundancy may be utilized on the UDP subflow, e.g., by encoding the control information utilizing error-correcting codes such as those in Reed-Solomon coding to improve the reliability of the delivery of the information.

In accordance with further aspects of the present disclosure, the selection of a particular path for the establishment of a corresponding subflow and the transmission of the control signaling may be made in accordance with the quality of the path as indicated by the health metric. That is, the multipath manager 420 may select a particular path to establish a subflow for control information, based on a health metric indicating that that particular path is the best path, or is for any suitable reason a desirable path over which to transmit the control signaling.

As discussed above, in accordance with an aspect of the present disclosure, the UDP subflow 406a may be managed by the multipath TCP layer. The illustration in FIG. 4 shows a UDP subflow 406a managed by the multipath TCP layer 404. In another aspect of the disclosure, the UDP subflow for the control signaling may be a UDP overlay managed at the application layer. In yet another aspect of the disclosure, the subflow for the control signaling may be a TCP subflow managed by the multipath TCP layer. In still another aspect of the disclosure, the subflow for the control signaling may be a TCP overlay managed at the application layer. Thus, in various aspects of the disclosure, the subflow for the control signaling may be provided over a TCP or a UDP connection, and may or may not be under the multipath TCP layer.

In a further aspect of the disclosure, the multipath manager 420 may temporarily or permanently switch data traffic such as that described above in relation to the subflows 406b-406d, from a TCP subflow to a UDP subflow such that data packets may be delivered over a UDP subflow. For example, a TCP subflow may be altered to become a UDP subflow, or the portion of the TCP flow allocated to a particular TCP subflow may be redirected to an established UDP subflow. Here, as discussed above in relation to the control information provided over the UDP subflow, data packets provided over a UDP subflow may be encoded utilizing a suitable error correction code such as Reed-Solomon or Raptor codes, etc., to improve reliability of delivery.

Figure 6:
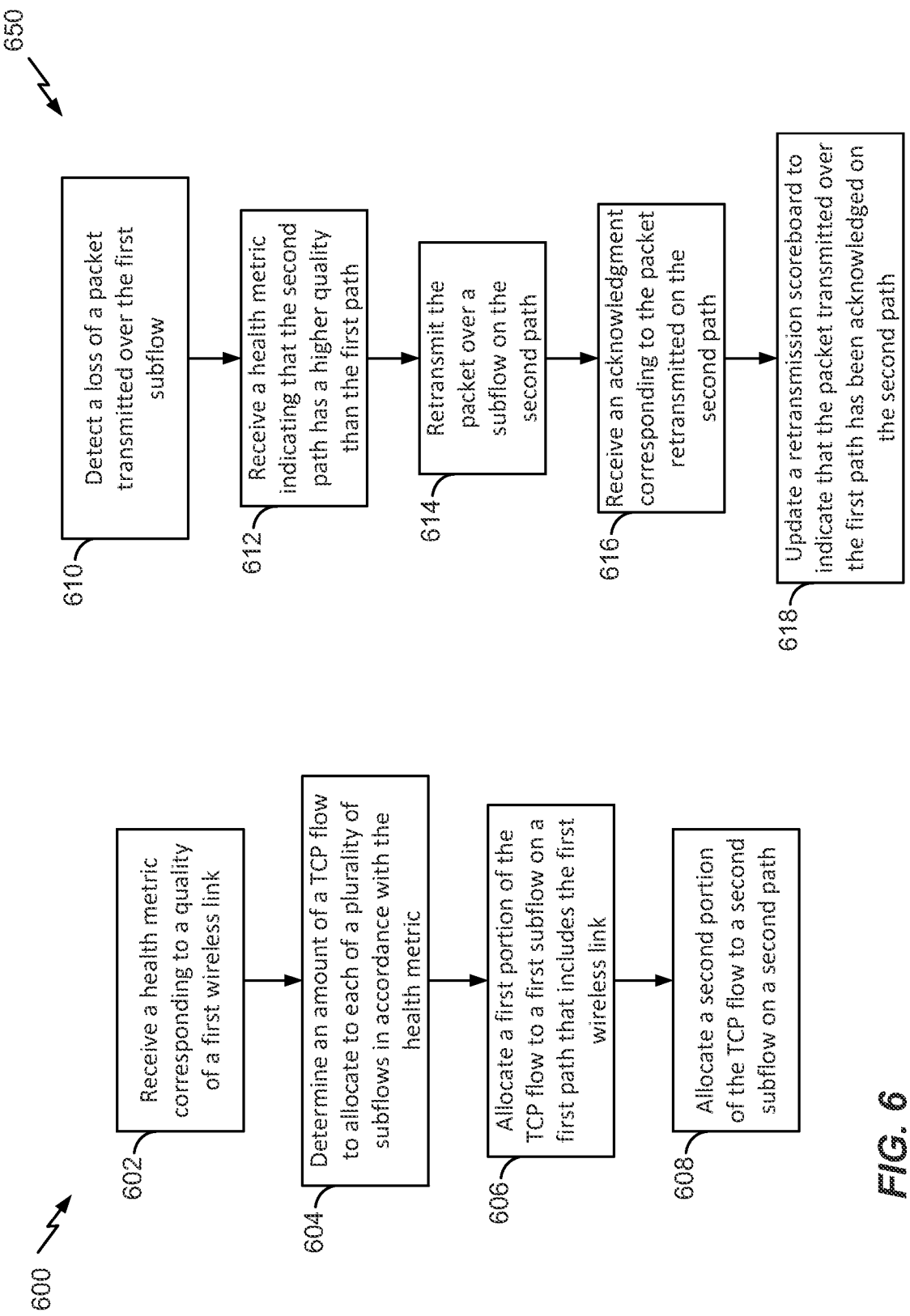
FIG. 6 is a flow chart illustrating methods of multipath TCP communication for dynamically adjusting signaling in accordance with the health metric.

FIG. 6 provides a flow chart illustrating an exemplary process 600 for wireless communication in accordance with another aspect of the disclosure relating to allocation of portions of a TCP flow among a plurality of subflows. Here, the process 600 may be implemented by the multipath manager 420, or more broadly by the multipath TCP layer 416. In general, the process 600 may be implemented by a suitable processing system 114 as illustrated in FIG. 1, or by any other suitable means for carrying out the described functions.

In accordance with the process 600, in block 602 the multipath manager 420 may receive a health metric corresponding to a quality of a first wireless link. Here, the health metric may additionally include information relating to the quality of any number of wireless links, such as those utilized by the WWAN interface 408a or 408b; the WPAN wireless link utilized by the WPAN interface 410; or the WWAN interface utilized by the proxy 312. In any case, the health metric may provide various information including link-layer performance characteristics of the respective wireless link. For example, the health metric may indicate the modulation, the coding scheme, the physical layer throughput of the link, a packet error rate, a bit error rate, or any other suitable MAC or link layer performance metrics.

In a further aspect of the disclosure, the wireless link conditions may include a so-called goodput, which relates to how many "good" bytes successfully pass through the link, i.e., taking into account non-acknowledged packets that are to be retransmitted. For example, the packets that will be retransmitted may not be counted in the goodput.

In a still further aspect of the disclosure, increasing or decreasing trends associated with the health metric may be detected by the multipath manager 420, in order to plan for future packet distributions across the paths. For example, if f(t) represents the health metric for a particular path at time t, $f_p(t)$ can represent a predicted version of f(t) based on a current value $f(t_0)$ and an estimated trend $f'(t_0)$. For example:

$$f_p(t) = f(t_0) + f'(t_0)(t - t_0).$$

In further examples, higher order terms such as $f''(t_0)$ may be utilized if desired. When predicting such trends in the health metric, the multipath manager 420 may utilize a predicted version of the health metric for a particular path until such time as a new update arrives, at which time the new health metric may be utilized.

Here, these link layer metrics can be communicated relatively quickly, e.g., on the order of tens of milliseconds to hundreds of milliseconds, enabling relatively more rapid adaptation of the allocation of packets for the TCP flow by the multipath manager 420. This compares favorably to transport level metrics, which generally can be communicated on the order of hundreds of milliseconds to several seconds between feedback bursts. Still, in accordance with aspects of the present disclosure, the wireless link conditions can include transport level metrics when available, including such measurements as the RTT or a smoothed RTT (SmRTT), the CW, the transport level throughput, and the number of packets in a transport level retransmission queue.

The health metric received in block 602 may be received over any suitable subflow, but in some aspects of the disclosure, the health metric may be received over a UDP subflow 406a designated for control signaling.

In block 604, the multipath manager 420 may determine an amount of the TCP flow to allocate to each of a plurality of subflows in accordance with the received health metric. In block 606, the multipath manager 420 may allocate a first portion of the TCP flow to a first subflow on a first path that includes the first wireless link, and in block 608, the multipath manager 420 may allocate a second portion of the TCP flow to a second subflow on a second path. Thus, the process 600 may provide for adaptation of the allocation of data among the subflows based on the health metric.

Returning once again to FIG. 4, as discussed above, the packet scheduling function of the multipath manager 420 in the multipath TCP layer 416 may provide a global sequence number for connection-level segments of data. Multipath TCP may further utilize a lower level sequence number for each subflow 414. That is, multipath TCP may utilize two sequence number spaces, including a global sequence number space and a subflow sequence number space. With the two sequence number spaces, segmentation, reassembly, and retransmissions of missing packets may be performed at either the multipath TCP layer 416 or the subflow layer 414.

In an aspect of the disclosure, a TCP scoreboard may further be utilized at each subflow 414, for keeping track of transmitted packets for the purpose of subflow-level acknowledgments and retransmissions. Further, a retransmission scoreboard may be utilized at the multipath TCP level, for keeping track of connection-level acknowledgments and retransmissions, as discussed below.

One feature of the use of the different levels of sequence number spaces is that multipath TCP enables acknowledgments and retransmissions at the connection level as well as at the subflow level. In an aspect of the present disclosure, this feature may be extended to enable a subflow-level packet transmitted on one subflow to be retransmitted on a second subflow when a health metric received by the multipath manager 420 indicates that the path that the second subflow uses has a higher quality than the path that the first subflow uses.

In conventional multipath TCP, management of retransmissions occurs at the subflow level, and once the packet is acknowledged it is then passed up to the multipath level. However, in an aspect of the present disclosure, at least a portion of the retransmission management function can be pulled up to the multipath TCP layer 416. In this fashion, since the multipath TCP layer 416 has received the health metrics corresponding to a plurality of the paths, packet retransmissions can be attempted on other paths if the health metric indicates that the transmission on a particular subflow is failing due to the path conditions corresponding to that subflow. Thus, retransmissions can be attempted on the best available path independent of the path the original transmission utilized.

Returning now to FIG. 6, a second flow chart is provided illustrating an exemplary process 650 for wireless communication in accordance with an aspect of the disclosure relating to retransmissions of packets originally sent on a first subflow, on a second subflow. As above, the process 650 may be implemented by the multipath manager 420, or more broadly by the multipath TCP layer 416. In general, the process 650 may be implemented by a suitable processing system 114 as illustrated in FIG. 1, or by any other suitable means for carrying out the described functions.

In one aspect of the disclosure, the process 650 assumes that the process 600 has been carried out. Thus, a first subflow corresponds to a subflow for which at least a portion of a TCP flow has been allocated, and a packet has been transmitted over a first subflow that utilizes a first path. In accordance with the process 650, in block 610, the multipath manager 420 may detect a loss of a packet transmitted over the first subflow. Here, any suitable process for determining a packet loss may be utilized, for example, by detecting multiple duplicate acknowledgments that acknowledge the same sequence numbers. Such a stall or packet loss may result for any number of reasons, such as the client device 304 entering an area with a poor WWAN signal, due to a deep fade, interference, etc. In block 612, the multipath manager 420 may receive a health metric indicating that a second path has a higher quality than the first path. The quality of the path can correspond to any one or any combination of the parameters discussed above that may be provided on the health metric, including but not limited to the wireless link conditions, the SmRTT, the CW, etc.

In block 614, the multipath manager 420 may retransmit the stalled packet over a subflow on the second path. In this way, based on the information that the second path has a higher quality than the first path, the probability that the packet will be received is improved. Thus, in block 616, after the packet is successfully received over the second subflow at the receiving end, the multipath manager 420 may receive an acknowledgment from the receiving end, corresponding to the packet retransmitted on the second path. Since the packet has been received, in block 618, the multipath manager 420 may update a retransmission scoreboard to indicate that the packet, which was originally transmitted on the first path, has been acknowledged as having been received over the second path.

That is, the multipath-TCP-level retransmission scoreboard is updated to indicate that the retransmission was successful over the second subflow. Here, the retransmission scoreboard may correspond to a retransmission queue that includes the global sequence number of the packet, as well as the subflow-level sequence numbers of the packet. The packet may have a plurality of subflow-level sequence numbers when it has been transmitted on a first subflow, and retransmitted on a second subflow. This way, the retransmission scoreboard may relate the subflow-level sequence numbers to the global sequence number, so that when the packet is acknowledged on one subflow, the multipath level can manage duplicate acknowledgments on other subflows if they occur. That is, after the retransmission of the packet over the second subflow is acknowledged, it is possible that the first path will recover and the original transmission of the packet will eventually succeed and be acknowledged at the subflow level. The retransmission scoreboard thus provides for handling of the duplicated acknowledgment. Here, the retransmission scoreboard may recognize, based on the global sequence number, that the packet has already been acknowledged in accordance with the retransmission over the second subflow, on the second path. Thus, potential errors caused by duplicate acknowledgments can be reduced or avoided.

In accordance with an aspect of the disclosure, the retransmission queue can be implemented on a separate dedicated retransmission subflow. Here, the retransmission subflow may be a TCP subflow, a UDP subflow, or an overlay (e.g., a TCP overlay or a UDP overlay).

In a further aspect of the disclosure, the selection of one of the paths for a retransmission subflow may be made in accordance with the health metric. That is, when the received health metric indicates that a particular path is the best path, or for any reason is a desirable path, the multipath manager 420 may establish a retransmission subflow (or, in another aspect, may designate an existing subflow to be a retransmission subflow) on the corresponding path. In this fashion, retransmitted packets may be provided on a good path, increasing the probability that a retransmitted packet will be successfully received.

In another aspect of the present disclosure, control information may be duplicated and provided over a plurality of subflows on a plurality of paths, to improve the reliability of the control information despite the potential failure of one of the paths. That is, while multipath TCP typically allocates portions of a data flow over multiple paths, the corresponding control signaling packets are typically transmitted over a single path. Here, failure of that path can result in at least temporary loss of control information, even utilizing aspects of the present disclosure in which the path on which control information is sent is dynamically adapted in accordance with the health metric.

In this aspect, while the health metric may assist in the determination of which plural paths to utilize for the control information, because multiple paths are utilized to carry duplicated control information, the health metric may not be necessary to improve the reliability of the control signaling. Here, eliminating the feedback relating to the path conditions may reduce overhead. However, in some aspects of the present disclosure, the utilization of the health metric may be combined with the duplicating of the control information over plural paths to further improve the reliability of receiving the control information.

Figure 7:
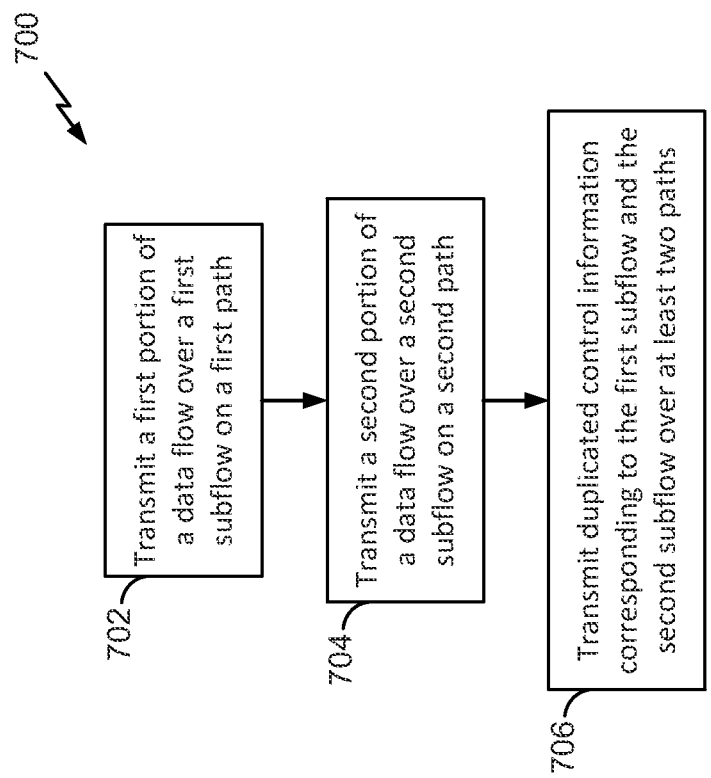
FIG. 7 is a flow chart illustrating a method of multipath TCP communication utilizing duplicated control signaling packets over a plurality of paths.

FIG. 7 provides a flow chart illustrating an exemplary process 700 for wireless communication in accordance with an aspect of the present disclosure in which duplicated control information is sent over subflows on a plurality of paths. Here, the process 700 may be carried out by the multipath manager 420, by a processing system 114 (see FIG. 1), or by any suitable means for carrying out the functions described therein.

In block 702, the process may transmit a first portion of a data flow over a first subflow on a first path; and in block 704, the process may transmit a second portion of the data flow over a second subflow on a second path. For example, the multipath manager 420 may allocate respective portions of the data flow over the first and second subflows. In block 706, the process may transmit duplicated control information corresponding to the first subflow and the second subflow, over at least two paths. For example, the duplicated control information may be sent over the first path and the second path. In some examples, the duplicated control information may utilize other paths different from the paths utilized for the data portions of the flow. In further examples, the control information may be carried on TCP or UDP subflows managed by the multipath TCP layer, UDP overlays, TCP overlays, or any combination of the above. In this way, loss of a control signaling packet on one of the duplicated subflows may not necessarily result in a loss of the control signaling packet, since a duplicate version of the packet is also provided on another path.

Figure 8:
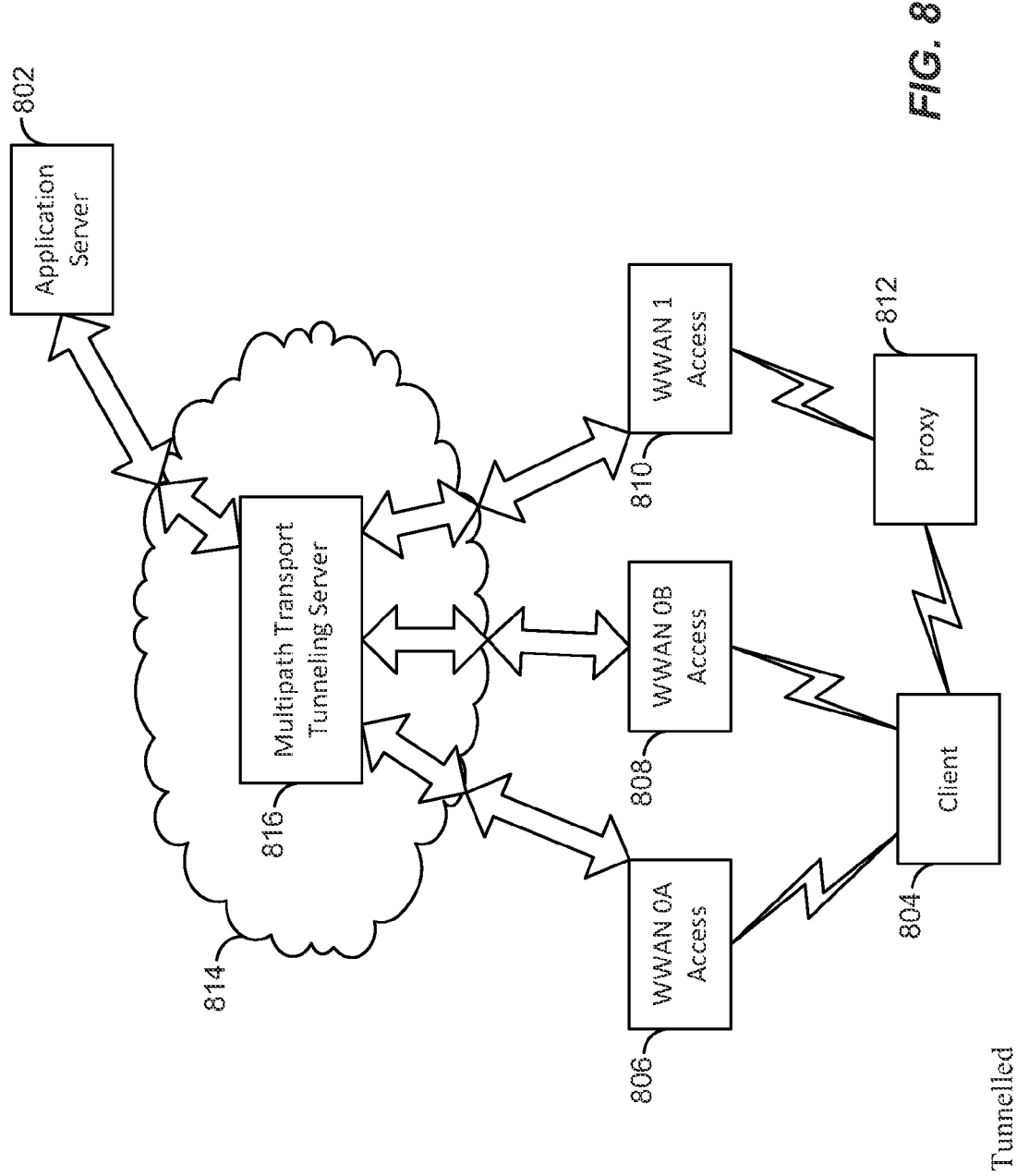
FIG. 8 is a simplified block diagram illustrating a multipath TCP connection utilizing tunneling in a wireless communication network.
Figure 9:
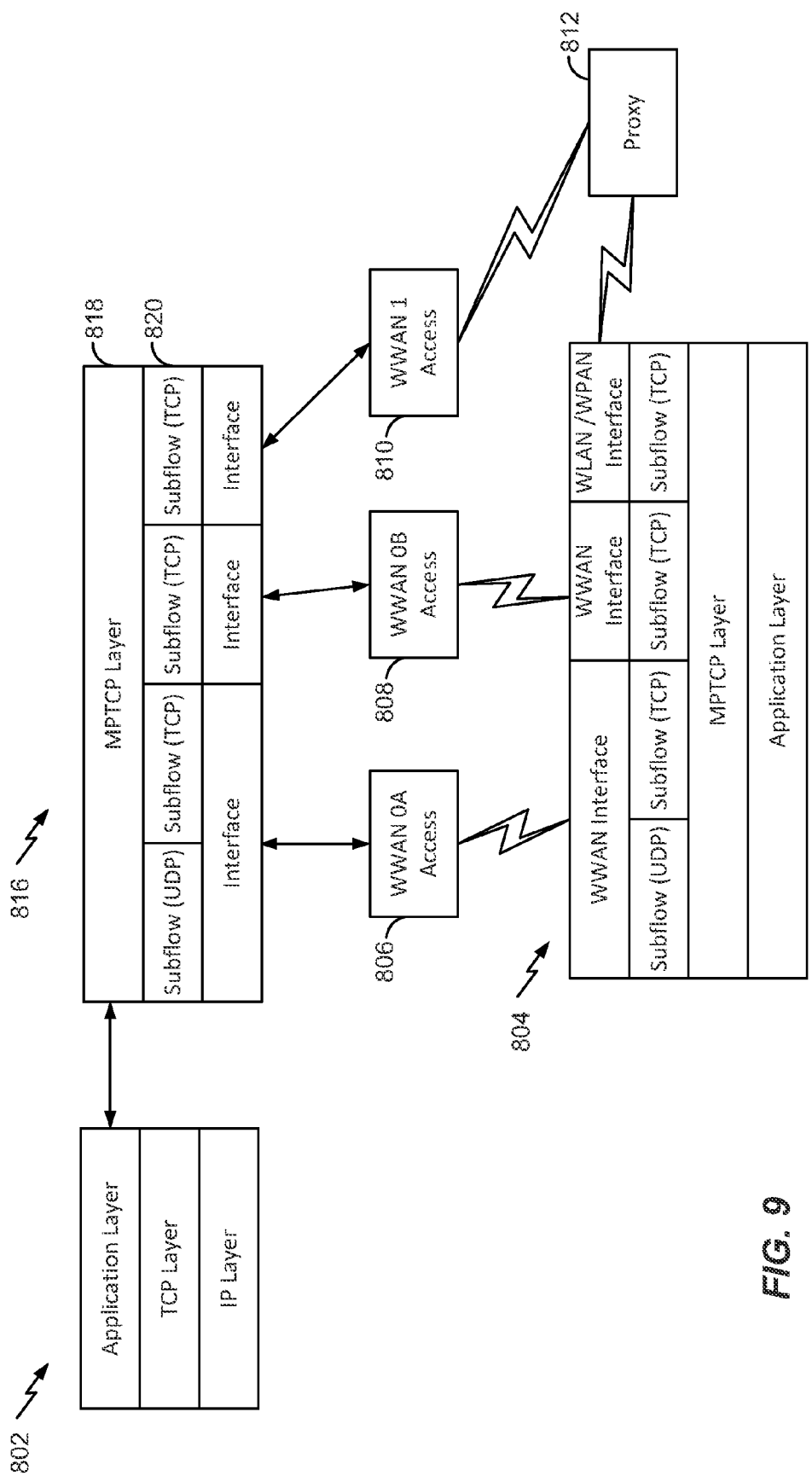
FIG. 9 is a schematic diagram illustrating protocol stacks in an example client-server communication over a multipath TCP connection utilizing tunneling in a wireless communication network.

FIGS. 8 and 9 are block diagrams illustrating another aspect of the disclosure that utilizes tunneling. That is, in the examples described above, both the source and the destination nodes (e.g., the application server 302 and the client 304) are multipath TCP capable. In other words, the application server 302 and the client 304 include a multipath TCP compliant software stack. However, in various aspects of the present disclosure, an application server 802 may have a legacy TCP stack, and may lack multipath TCP functionality. Here, while it may be relatively easier to deploy client devices 804 that include a multipath TCP compliant software stack, utilization of an application server having the multipath TCP capability may not be an option. Thus, tunneling may be utilized to implement multipath TCP in accordance with various aspects of the present disclosure with a server having a legacy TCP stack.

In FIG. 8, the client device 804, the proxy 812, and the WWAN access points 806, 808, and 810 may be substantially the same as their corresponding nodes illustrated in FIGS. 3 and 4. Further the network cloud 814 may be any suitable network such as the Internet. Here, the network cloud 814 includes a multipath transport tunneling server 816 for enabling tunneling of the multipath TCP flow to the application server 802. FIG. 9 is a schematic diagram illustrating some of the nodes of FIG. 8 to show the software stack at the multipath transport tunneling server 816 and the application server 802 to further illustrate the tunneling.

Here, the multipath transport tunneling server 816 takes part of the role of the multipath-capable application server 302, including interfacing with the respective WWAN access points 806, 808, and 810. The multipath transport tunneling server 816 includes the multipath TCP layer 818 for managing a plurality of subflows 820. Here, the multipath transport tunneling server combines the subflows and presents the flow to the application server 802. In an aspect of the present disclosure, the flow may be presented to the application server 802 as a conventional TCP flow. In this way, the benefits of multipath transport, including the aspects of the present disclosure wherein the health metric corresponding to the wireless link conditions, or the duplication of the control signaling packets over a plurality of the paths, may be afforded to a flow between a client 804 and a conventional application server 802 that lacks multipath TCP capabilities.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication over a multipath TCP connection, comprising:
    communicating over a first subflow on a first path that comprises a first wireless link, wherein the first path is between a first node and a second node;
    communicating over a second subflow on a second path between the first node and the second node; and
    sending one or more control signaling packets between the first node and the second node, the control signaling packets comprising a health metric indicative of a quality of the first wireless link comprising a link-layer characteristic of the first wireless link,
    wherein the quality of the first wireless link comprises a goodput corresponding to an amount of data packets, excluding data packets to be retransmitted, successfully passed through the first wireless link, and
    wherein the health metric is sent on a third subflow on at least one of the first path or the second path.

2. The method of claim 1, wherein the quality of the first wireless link comprises a link-layer characteristic of the first wireless link, comprising at least one of a modulation scheme, a coding scheme, a signal strength, a physical layer throughput, a packet error rate, or a bit error rate corresponding to the first wireless link.

3. The method of claim 1, wherein the quality of the first wireless link comprises a TCP-layer characteristic of the first path, comprising at least one of a congestion window, a round trip time, a smoothed round trip time, a transport level throughput, or a number of packets in a corresponding retransmission queue.

4. The method of claim 1, wherein the second path comprises a second wireless link, and wherein the health metric further corresponds to a quality of the second wireless link.

5. The method of claim 1, wherein the first subflow comprises a TCP subflow corresponding to a multipath TCP flow; and wherein the second subflow comprises a TCP subflow corresponding to the multipath TCP flow.

6. The method of claim 1, wherein the third subflow comprises a UDP overlay.

7. The method of claim 1, wherein the third subflow comprises a TCP overlay.

8. The method of claim 1, wherein the third subflow comprises a TCP subflow managed by a multipath TCP entity.

9. The method of claim 1, wherein the third subflow comprises a UDP subflow managed by a multipath TCP entity.

10. The method of claim 1, further comprising sending an acknowledgment corresponding to a received packet over one of the first subflow or the second subflow.

11. The method of claim 10, further comprising determining whether the received packet is a duplicate packet for which an acknowledgment has already been sent.

12. The method of claim 1,
    wherein the first path comprises a first IP address at a source and a second IP address at a destination, and
    wherein the second path comprises a third IP address at the source and a fourth IP address at the destination.

13. The method of claim 12, wherein the first IP address is different from the third IP address.

14. The method of claim 12, wherein the second IP address is different from the fourth IP address.

15. The method of claim 1, wherein the health metric further corresponds to a round trip time and a congestion window.

16. A method of wireless communication over a multipath TCP connection, comprising:

receiving one or more control signaling packets at a first node from a second node, the control signaling packets comprising a health metric corresponding to a quality of a first wireless link comprising a link-layer characteristic of the first wireless link;

allocating a first portion of a TCP flow to a first subflow on a first path that comprises the first wireless link, wherein the first path is between the first node and the second node;

allocating a second portion of the TCP flow to a second subflow on a second path between the first node and the second node, wherein an amount of the first portion and an amount of the second portion is determined in accordance with the health metric; and retransmitting a packet transmitted over the first subflow, on the second subflow in accordance with the health metric indicating that the second path has a higher quality than the first path.

17. The method of claim 16, wherein the retransmitting comprises utilizing the second subflow on the second path.

18. The method of claim 16, wherein the retransmitting comprises utilizing a third subflow on the second path.

19. The method of claim 16, further comprising:
receiving an acknowledgment corresponding to the packet transmitted on the second path; and
updating a retransmission scoreboard to indicate that the packet transmitted over the first path has been acknowledged on the second path.

20. The method of claim 16, wherein the receiving of the health metric comprises receiving information over a UDP overlay.

21. The method of claim 16, wherein the receiving of the health metric comprises receiving information over a third subflow on at least one of the first path or the second path.

22. The method of claim 16, further comprising:
determining a predicted health metric corresponding to a trend in the health metric, the trend corresponding to a change in the health metric over time,
wherein the amount of the first portion and the amount of the second portion are further determined in accordance with the predicted health metric.

23. A method of wireless communication over a multipath TCP connection comprising a plurality of paths between a first node and a second node, the method comprising:
transmitting a first portion of a data flow over a first subflow on a first path of the plurality of paths;
transmitting a second portion of the data flow over a second subflow on a second path of the plurality of paths; and
transmitting one or more control signaling packets between the first node and the second node, the control signaling packets comprising control information corresponding to the first subflow and the second subflow over at least two paths of the plurality of paths, wherein the control information is duplicated over each of the at least two paths.

24. A computer program product for wireless communication over a multipath TCP connection, the computer program product comprising:
a non-transitory computer-readable medium comprising:
instructions for causing a computer to communicate over a first subflow on a first path that comprises a first wireless link, wherein the first path is between the computer and a node;
instructions for causing the computer to communicate over a second subflow on a second path between the computer and the node; and
instructions for causing the computer to send one or more control signaling packets between the computer and the node, the control signaling packets comprising a health metric indicative of a quality of the first wireless link comprising a link-layer characteristic of the first wireless link,
wherein the quality of the first wireless link comprises a goodput corresponding to an amount of data packets, excluding data packets to be retransmitted, successfully passed through the first wireless link, and
wherein the health metric is sent on a third subflow on at least one of the first path or the second path.

25. A computer program product for wireless communication over a multipath TCP connection, the computer program product comprising:
a non-transitory computer-readable medium comprising:
instructions for causing a computer to receive one or more control signaling packets at the computer from a node, the control signaling packets comprising a health metric corresponding to a quality of a first wireless link comprising a link-layer characteristic of the first wireless link;
instructions for causing the computer to allocate a first portion of a TCP flow to a first subflow on a first path that comprises the first wireless link, wherein the first path is between the computer and the node;
instructions for causing the computer to allocate a second portion of the TCP flow to a second subflow on a second path between the computer and the node, wherein an amount of the first portion and an amount of the second portion is determined in accordance with the health metric; and
retransmitting a packet transmitted over the first subflow, on the second subflow in accordance with the health metric indicating that the second path has a higher quality than the first path.

26. A computer program product for wireless communication over a multipath TCP connection comprising a plurality of paths between a computer and a node, the computer program product comprising:
a non-transitory computer-readable medium comprising:
instructions for causing the computer to transmit a first portion of a data flow over a first subflow on a first path of the plurality of paths;
instructions for causing the computer to transmit a second portion of the data flow over a second subflow on a second path of the plurality of paths; and
instructions for causing the computer to transmit one or more control signaling packets between the computer and the node, the control signaling packets comprising control information corresponding to the first subflow and the second subflow over at least two paths of the plurality of paths, wherein the control information is duplicated over each of the at least two paths.

27. An apparatus for wireless communication over a multipath TCP connection, comprising:
at least one processor; and
a memory coupled to the at least one processor,
wherein the at least one processor is configured to:
communicate over a first subflow on a first path that comprises a first wireless link, wherein the first path is between the apparatus and a node;
communicate over a second subflow on a second path between the apparatus and the node; and
send one or more control signaling packets between the apparatus and the node, the control signaling packets comprising a health metric indicative of a quality of the first wireless link comprising a link-layer characteristic of the first wireless link,
wherein the quality of the first wireless link comprises a goodput corresponding to an amount of data packets, excluding data packets to be retransmitted, successfully passed through the first wireless link, and
wherein the health metric is sent on a third subflow on at least one of the first path or the second path.

28. An apparatus for wireless communication over a multipath TCP connection, comprising:
at least one processor; and
a memory coupled to the at least one processor,
wherein the at least one processor is configured to:
receive one or more control signaling packets at the apparatus from a node, the control signaling packets comprising a health metric corresponding to a quality of a first wireless link comprising a link-layer characteristic of the first wireless link;
allocate a first portion of a TCP flow to a first subflow on a first path that comprises the first wireless link, wherein the first path is between the apparatus and the node;
allocate a second portion of the TCP flow to a second subflow on a second path between the apparatus and the node, wherein an amount of the first portion and an amount of the second portion is determined in accordance with the health metric; and
retransmitting a packet transmitted over the first subflow, on the second subflow in accordance with the health metric indicating that the second path has a higher quality than the first path.

29. An apparatus for wireless communication over a multipath TCP connection comprising a plurality of paths between the apparatus and a node, the apparatus comprising:
at least one processor; and
a memory coupled to the at least one processor,
wherein the at least one processor is configured to:
transmit a first portion of a data flow over a first subflow on a first path of the plurality of paths;
transmit a second portion of the data flow over a second subflow on a second path of the plurality of paths; and
transmit one or more control signaling packets between the apparatus and the node, the control signaling packets comprising control information corresponding to the first subflow and the second subflow over at least two paths of the plurality of paths, wherein the control information is duplicated over each of the at least two paths.

* * * * *